(12) United States Patent
Penot et al.

(10) Patent No.: US 8,638,089 B2
(45) Date of Patent: *Jan. 28, 2014

(54) DEVICE FOR LOCATING WHETHER A WHEEL-TIRE ASSEMBLY IS POSITIONED ON THE RIGHT OR THE LEFT OF A VEHICLE

(75) Inventors: Thierry Penot, Clermont-Ferrand (FR); Franck Daumas, Nohanent (FR); Xavier Huchard, Pont du Chateau (FR); Christophe Villien, Grenoble (FR)

(73) Assignees: Compagnie Generale des Etablissements Michelin, Clermont-Ferrand (FR); Michelin Recherche et Technique S.A., Granges-Paccot (CH); TRW Automotive U.S. LLC, Livonia, MI (US)

( * ) Notice: Subject to any disclaimer, the term of this patent is extended or adjusted under 35 U.S.C. 154(b) by 315 days.

This patent is subject to a terminal disclaimer.

(21) Appl. No.: 13/003,916
(22) PCT Filed: Jul. 21, 2009
(86) PCT No.: PCT/EP2009/059375
§ 371 (c)(1), (2), (4) Date: Mar. 8, 2011
(87) PCT Pub. No.: WO2010/010095
PCT Pub. Date: Jan. 28, 2010

(65) Prior Publication Data
US 2011/0148401 A1 Jun. 23, 2011

(30) Foreign Application Priority Data
Jul. 22, 2008 (FR) ..................................... 08 55001

(51) Int. Cl.
G01B 7/30 (2006.01)

(52) U.S. Cl.
USPC ................................ 324/207.11; 324/207.25

(58) Field of Classification Search
USPC ......................................... 324/207.11, 207.25
See application file for complete search history.

(56) References Cited

U.S. PATENT DOCUMENTS

| 7,055,917 B2 | 6/2006 | Huchard et al. | 303/188 |
| 7,395,701 B2 | 7/2008 | Huchard | 73/146 |
| 8,095,333 B2 * | 1/2012 | Penot et al. | 702/145 |

(Continued)

FOREIGN PATENT DOCUMENTS

| EP | 0 760 299 A1 | 3/1997 |
| EP | 1 106 397 A2 | 6/2001 |

(Continued)

Primary Examiner — Reena Aurora
(74) Attorney, Agent, or Firm — Fitzpatrick, Cella, Harper & Scinto

(57) ABSTRACT

A self-contained device intended to be carried by a wheel-tire assembly in order to locate whether the assembly is positioned on the right side or on the left side of a vehicle is described. The device includes two magnetic sensors with axes of maximum sensitivity, the sensors providing two periodic signals that are phase shifted relative to one another. Each signal is representative of variations in the magnitude of the magnetic field detected by the sensor during a revolution of the wheel-tire assembly. The device also includes a processing unit programmed to determine, from the phase shift between the two periodic signals, a direction in which the wheel-tire assembly is rotating and to deduce, from this direction of rotation and from a direction of travel of the vehicle, whether the wheel-tire assembly is located on the right side or on the left side. The two magnetic sensors are intended to be positioned on the wheel-tire assembly at distinct azimuthal locations. A filtering element of the device is designed to eliminate components of the two periodic signals having frequencies that are below or equal to a given frequency.

17 Claims, 4 Drawing Sheets

(56) References Cited

U.S. PATENT DOCUMENTS

| | | | |
|---|---|---|---|
| 2006/0132356 A1 | 6/2006 | Dulac | 342/173 |
| 2006/0142911 A1 | 6/2006 | Allard et al. | 701/29 |
| 2006/0152212 A1 | 7/2006 | Beranger et al. | 324/165 |
| 2008/0197837 A1 | 8/2008 | Dulac | 324/207.16 |
| 2009/0144017 A1 | 6/2009 | Penot et al. | 702/150 |

FOREIGN PATENT DOCUMENTS

| | | |
|---|---|---|
| EP | 1 669 221 A1 | 6/2006 |
| EP | 1 800 913 A1 | 6/2007 |
| FR | 2 856 145 A1 | 12/2004 |
| FR | 2 888 656 A1 | 1/2007 |

* cited by examiner

US 8,638,089 B2

DEVICE FOR LOCATING WHETHER A WHEEL-TIRE ASSEMBLY IS POSITIONED ON THE RIGHT OR THE LEFT OF A VEHICLE

FIELD OF THE INVENTION

The invention relates to a device for locating whether a wheel-tire assembly is positioned on the right or the left of a vehicle, and to the wheel-tire assemblies equipped with such devices.

TECHNICAL BACKGROUND

Motor vehicles are, for safety reasons, increasingly being fitted with monitoring systems comprising sensors mounted on each of the wheel-tire assemblies of the vehicle, these being devoted to measuring parameters, such as tire temperature or pressure, and intended to inform the driver of any abnormal variation in the parameter being measured.

These monitoring systems usually comprise a sensor positioned in each wheel-tire assembly with a microprocessor and a radiofrequency transmitter, and a central processing unit that receives the signals emitted by the transmitters, with a processor incorporating a radiofrequency receiver connected to an antenna.

One of the problems that such monitoring systems have to overcome lies in the need to associate, with each signal received by the receiver of the central processing unit, information as to the location of the sensor and therefore as to which wheel-tire assembly has sent this signal, this need persisting throughout the life of the vehicle, that is to say still having to be met even after wheel-tire assemblies have been changed or, more simply, have been swapped around.

Document EP 1 669 221 A1 discloses a self-contained device intended to be carried by a wheel-tire assembly in order to locate whether the assembly is positioned on the right or on the left of a vehicle, and comprising:

two magnetic sensors with axes of maximum sensitivity;
means of measuring a signal at the terminals of each of the magnetic sensors, these means being capable of delivering two periodic signals which are phase shifted relative to one another and each representative of the variations in the magnitudes of the magnetic field as detected by the magnetic sensors during a revolution of the wheel-tire assembly; and
a processing unit programmed to determine, from the phase shift between the two periodic signals, the direction in which the wheel-tire assembly is rotating and to deduce, from this direction of rotation and from the direction of travel of the vehicle, whether the wheel-tire assembly is located on the right or on the left.

This device is such that the axes of maximum sensitivity of the two magnetic sensors are intended to be positioned in the wheel-tire assembly at a plane secant to the axis of rotation of the wheel-tire assembly, and offset from one another, in this secant plane, by a predetermined angle.

The two sensors in this device detect the overall magnetic field surrounding them, which is made up of the Earth's magnetic field combined with the vehicle's environmental magnetic field. This vehicle environmental magnetic field is the resultant of a collection of vehicle fields, which are created by the presence of electrical or magnetic equipment on board the vehicle and by metallic components close to the wheel arches such as the brake calipers and the components of the ground-contact system.

There are, however, certain points on the globe and certain directions of vehicle travel for which the contribution of the Earth's magnetic field as measured by the two sensors of the above device becomes negligible in comparison with the contribution of the environmental magnetic field, and this may present problems in exploiting the signals.

SUMMARY OF THE INVENTION

One aspect of the invention is a self-contained device similar to the device of document EP 1 669 221 A1, characterized in that the two magnetic sensors are intended to be positioned on the wheel-tire assembly at distinct azimuthal locations, and in that the device comprises a filtering element designed to eliminate those components of the two periodic signals the frequencies of which are below or equal to a given frequency.

As a preference, the axes of maximum sensitivity of the two magnetic sensors are intended to be positioned in the wheel-tire assembly at similar positions.

What "similar" means is positions that can be practically superimposed by rotation about the axis of rotation of the wheel-tire assembly. The positions of the two axes of maximum sensitivity may, however, be not strictly superimposable, particularly as a result of manufacturing spread on the devices and on their installation in the wheel-tire assembly. The magnitude of the allowable offset that still qualifies as "similar" is a few degrees of inclination relative to one another.

The two magnetic sensors are intended to be positioned at different azimuthal positions. As a result, the signals from the two sensors will be associated not only with their rotation in the Earth's magnetic field but also with the fact that they experience the same local magnetic field in succession. The contribution due to the Earth's magnetic field is periodic and identical to the rotational frequency of the wheel-tire assembly. By contrast, the signals originating from the magnetic dipoles of the vehicle (the local field) are more localized; their predominant frequency-related components may thus be more than twice the rotational frequency of the wheel-tire assembly. The filtering element introduced into the device therefore greatly reduces the contribution that the Earth's magnetic field makes to the signal, allowing robust exploitation of the signals connected with the environmental magnetic field.

As described in EP 1 669 221, the signals measured at the terminals of each sensor are phase shifted from one another. However, the analyzed signals are mainly associated with the contribution made by the environmental magnetic field surrounding the vehicle rather than the Earth's magnetic field and this phase shift is associated mainly with the temporal magnitude of the circumferential difference in azimuthal position of the two sensors.

The filtering element may be a filter that has a cut-off frequency of the high-pass type higher than the rotational frequency of the tire.

A filter such as this may be an adaptive filter dependent on the rotational speed of the wheel-tire assembly.

The adaptive filter may be looped back with the amplitude of the analyzed signal. This method of looping back has the advantage of being easier to implement than a loop-back with the rotational frequency of the wheel-tire assembly.

According to a particularly simple and economical embodiment, the filtering element comprises a cut-off frequency of the high-pass type, higher than the intended range of operating frequencies of the device. By way of example, for passenger vehicle tires of standard size and for an intended operating range of 20 to 120 km/h, the range of rotational frequencies is then of the order of 3 to 17 Hz and the filter should have a cut-off frequency higher than 17 Hz.

The filtering element also preferably comprises a filter of the low-pass type of the order of 100 to 200 Hz. This low-pass filter makes it possible to reduce the noise on the analyzed signals.

Advantageously, the two magnetic sensors are intended to be positioned on the wheel-tire assembly at substantially the same distance from the axis of rotation of the assembly.

This allows coils of the two magnetic sensors to be sensitive to the flux variations of the same environmental field.

The two magnetic sensors may have their two axes of maximum sensitivity coincident or be intended to be positioned in the wheel-tire assembly with their axes of maximum sensitivity directed circumferentially.

In these two very similar embodiments, thanks to the presence of the filtering element, the post-filtering signals are connected chiefly with the components of the environmental magnetic field that are normal to the axial direction. These embodiments can be particularly useful in certain vehicle configurations.

According to a preferred embodiment, the two magnetic sensors are intended to be positioned on the wheel-tire assembly in such a way that the two axes of maximum sensitivity are directed more or less parallel to the axis of rotation of the wheel-tire assembly.

Directing the two axes of maximum sensitivity of the two magnetic sensors parallel to the axis of rotation means that whatever the orientation of the Earth's magnetic field, this field has practically no influence on the amplitude of the signals measured at the terminals of the two magnetic sensors. The amplitude of the signals is then connected only with the environmental field surrounding the device.

As a preference, the circumferential distance between the centers of the two magnetic sensors is between 1 and 8 cm. A distance shorter than 1 cm means that the phase shift between the two signals can no longer be determined with sufficient precision for the usual acquisition frequencies, and a distance longer than 8 cm makes it difficult to incorporate the two magnetic sensors into one single housing.

The temporal phase shift between the two signals output by the magnetic sensors may be determined after the signals have been amplified and shaped. As a preference, the processing unit is programmed to determine the phase shift and, more simply, the sign of this phase shift between the two periodic signals by cross-correlating the two signals.

A further aspect of the invention is a wheel-tire assembly equipped with a device such as this. The device may, for example, be designed to be attached to an inflation valve or attached to the surface of the wheel rim; it is also possible to attach the device to the interior surface of the tire or to incorporate the device into the structure thereof.

BRIEF DESCRIPTION OF THE DRAWINGS

Aspects of the invention will be better understood from the detailed description below considered together with the attached drawings, in which.

These figures illustrate embodiments of a device in which magnetic sensors thereof have their directions of maximum sensitivity directed axially, but also apply to the other embodiments claimed herein. They are given purely by way of illustration and do not imply any restriction to the scope of the claims.

DETAILED DESCRIPTION OF EMBODIMENTS OF THE INVENTION

Figure 1:
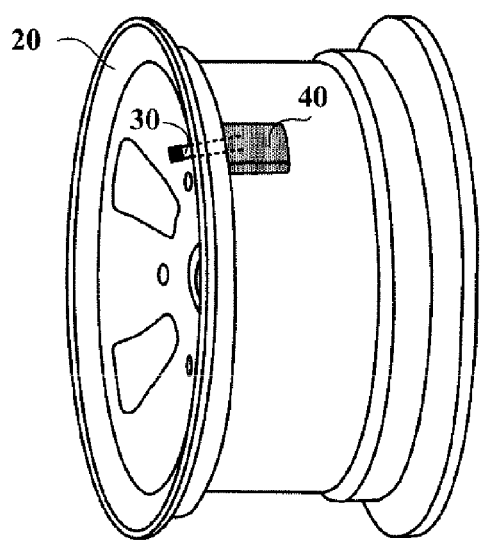
FIG. 1 is a schematic perspective view of a wheel of the prior art, equipped with a system of sensors secured to the inflation valve.

FIG. 1 depicts a perspective view of a wheel 20 of the prior art, equipped with an inflation valve 30 and with a housing 40 designed to accommodate sensors. For purposes of clarity, a tire is not depicted.

Figure 2:
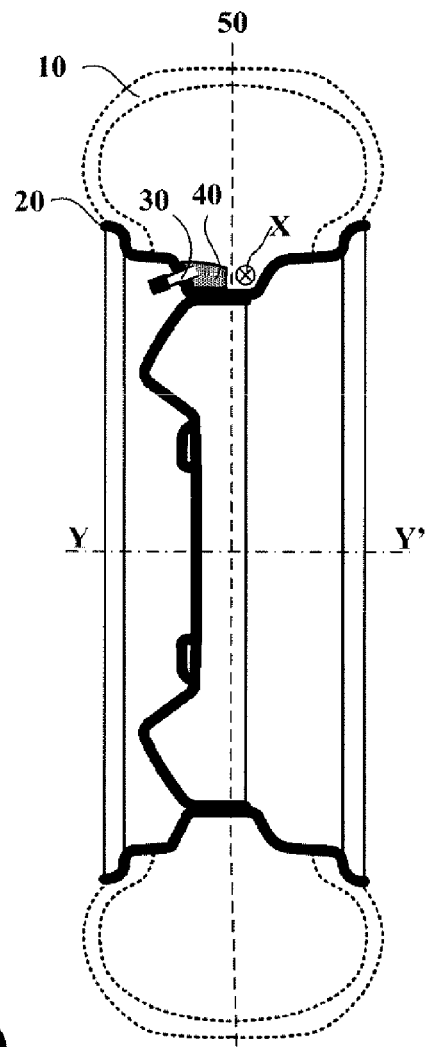
FIG. 2 is a schematic sectioned view of a wheel-tire assembly of the prior art, equipped with a system of sensors secured to the inflation valve.

FIG. 2 depicts a cross-sectioned view of another wheel-tire assembly of the prior art, formed of a tire 10 and a wheel 20 and equipped with an inflation valve 30 and with a housing 40 designed to accommodate sensors. A line showing a midplane 50 of the tire 10, that of a circumferential or tangential direction X at the housing 40, and that of an axis of rotation YY' of the wheel-tire assembly are also depicted.

Figure 3:
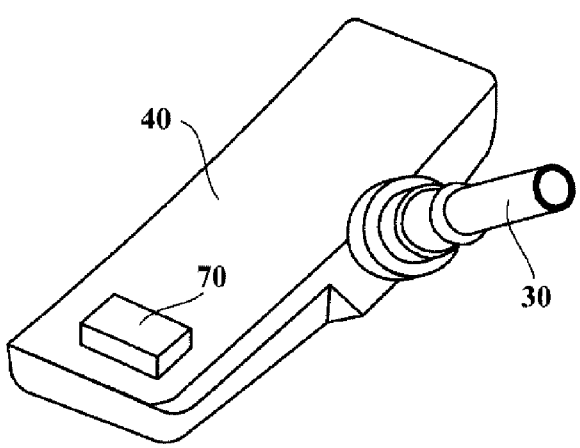
FIG. 3 is a schematic perspective view of an inflation valve and of a housing secured to the valve to accommodate the sensors.

FIG. 3 is a schematic perspective view of an inflation valve 30 and of a housing 40 secured to the valve 30 and intended to accommodate sensors. A housing such as this is known, for example, in EP 1 106 397. It may be adapted to accept a device 70 according to an aspect of the invention.

Figure 4:
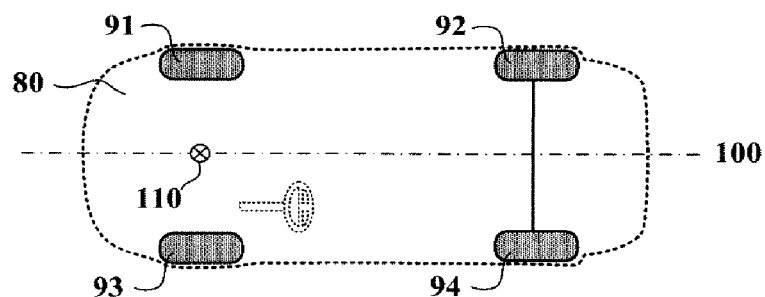
FIG. 4 is a schematic plan view of a vehicle equipped with devices according to an aspect of the invention.

FIG. 4 is a schematic plan view of a vehicle 80 with wheel-tire assemblies 91 to 94 that are equipped with devices according to an aspect of the invention, including two magnetic sensors that are sensitive to the vehicle's environmental magnetic field, the two magnetic sensors being positioned in such a way that their axes are parallel or even coincident.

Swapping a wheel-tire assembly from the left side to the right side of the vehicle 80, keeping the same side of the assembly on the outboard side of the vehicle can be analyzed as a rotation, possibly followed by a translational movement. Thus, if the assembly 91 or the assembly 92 is swapped for the assembly 93, the latter is turned through 180° about an axis 110 perpendicular to the ground (in order to reach the position of the assembly 91) then translationally shifted (if the target position is the position 92). The special way in which the magnetic sensors are arranged reduces the rotational symmetry of the device such that the relative configuration of the magnetic sensors differs from one side of the vehicle to the other. Even rotating the wheel-tire assembly about its axis of rotation in the course of driving does not allow the magnetic sensors to attain the same relative configuration on both sides of the vehicle. This relative configuration is therefore characteristic of each side of the vehicle.

Figure 5:
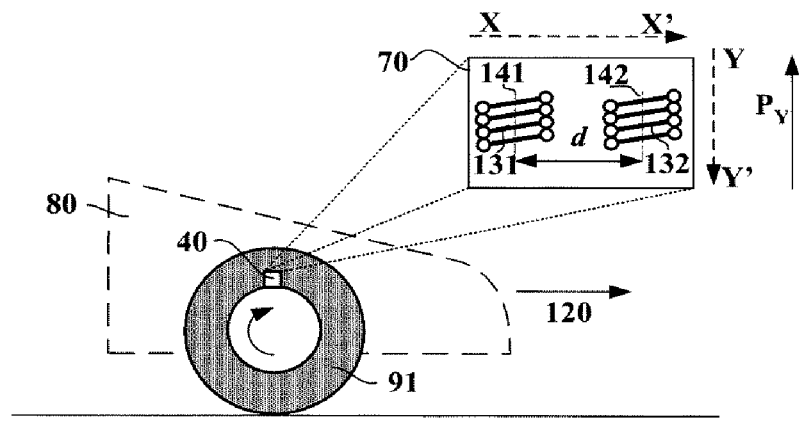
FIG. 5 is a schematic side view of a wheel-tire assembly equipped with a device according to an aspect of the invention, mounted on the right side of a vehicle.
Figure 6:
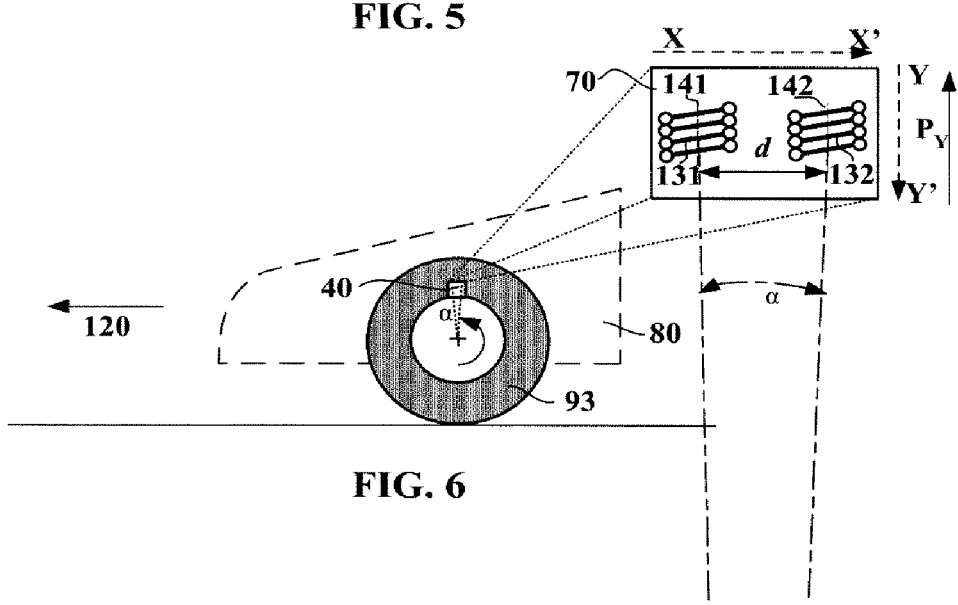
FIG. 6 is a schematic side view of a wheel-tire assembly equipped with a device according to an aspect of the invention, mounted on the left side of a vehicle.

This fundamental observation is illustrated in FIGS. 5 and 6 which are side views of wheel-tire assemblies equipped with a device 70 according to an aspect of the invention, mounted on the right side (FIG. 5) and left side (FIG. 6) of the vehicle.

FIG. 5 depicts a wheel-tire assembly 91 mounted on the front right side of a vehicle 80 moving forward in a direction indicated by an arrow 120. A device 70 according to an aspect of the invention is mounted in a housing 40 and fixed to the assembly 91. The device includes two magnetic sensors 131 and 132, which are sensitive to the vehicle's environmental magnetic field P. Each magnetic sensor includes a coil with a mild steel core. The two sensors 131 and 132 are positioned with their respective axes 141 and 142 directed parallel to the axis of rotation YY' of the wheel-tire assembly 91. The two sensors 131 and 132 are thus sensitive practically only to the YY' component or axial component of the vehicle's environmental magnetic field $P_Y$. The two axes 141 and 142 are also circumferentially offset, that is to say, offset in a direction XX', at a distance d. A corresponding azimuthal offset α is illustrated in FIG. 6.

FIG. 6 depicts a wheel-tire assembly 93 mounted on the front left side of a vehicle 80 moving forward in a direction 120. A same device 70 according to an aspect of the invention is mounted in a housing 40 and fixed in a same way to the assembly 93 as in the assembly 91.

Comparing FIGS. 5 and 6 provides an understanding of how the device 70 works for self-location. When the assembly provided with the device 70 is mounted on the right side of the vehicle (as in FIG. 5) and the vehicle moves forward, the sensor 132 is always leading the sensor 131 in terms of phase: the wheel-tire assembly has to rotate by a certain angle about its axis of rotation for the sensor 131 to come into the same position with respect to the vehicle's environmental magnetic field as the sensor 132 initially occupied. The situation is reversed for an assembly provided with the device 70 mounted on the left side of the vehicle (as in FIG. 6); here, it is the sensor 131 that leads the sensor 132 in terms of phase. All that is then required is to determine the relative phase shift between the signals measured by the two sensors 131 and 132 in order to determine, for a given direction of movement (forward or backward) of the vehicle 80, on which side of the vehicle the sensors 131 and 132, and thus the corresponding wheel-tire assemblies, are located.

Figure 7:
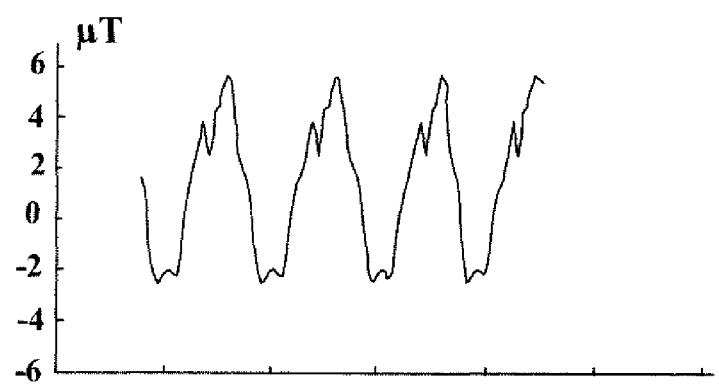
FIG. 7 depicts the axial component of the remnant local magnetic field measured on a vehicle rear axle.

FIG. 7 depicts a curve representing a YY' component of the vehicle's environmental magnetic field measured with a magnetometer fixed to a wheel rim of a wheel. This curve was measured from a rear axle assembly of a BMW 323i.

The magnetometer or sensor was fixed to the wheel rim in a position very close to that of a device attached to the valve of this wheel. It may be seen that the vehicle's environmental field in the case of the rear axle of this particular vehicle and assessed at a housing attached to an inflation valve, has a peak-to-peak amplitude of the order of 9 μT.

Each sensor is a passive magnetic sensor, which produces a signal proportional to a variation in magnetic flux passing through it according to the Faraday-Lenz Law. The signal generated by each sensor is stronger the greater and the more rapid the variations in magnetic flux passing through the sensor. The amplitude of the signal is therefore also dependent on the rotational speed of the sensor. In one particular embodiment, the magnitude of the signal is integrated in order to determine the magnitude of the field and thus discount the effect of speed.

Figure 8:
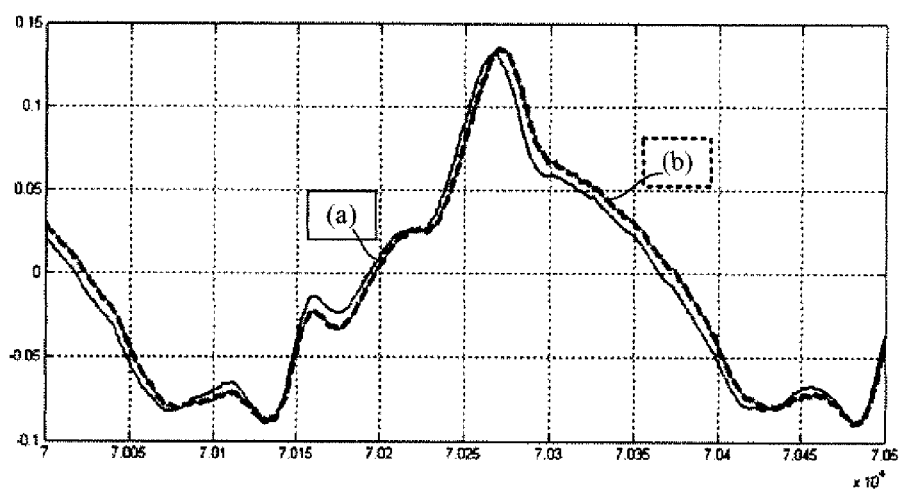
FIG. 8 depicts signals obtained on a vehicle the tires of which are equipped with a device according to an aspect of the invention, prior to digital processing.

FIG. 8 depicts curves representing signals measured at the terminals of the two sensors 131 and 132 as a function of the angle of rotation of the wheel-tire assembly (in degrees).

Each sensor produces a periodic signal the frequency of which is the rotational frequency of the wheel-tire assembly. The frequency is therefore dependent on the speed of the vehicle. The extreme values are reached when the vehicle's environmental magnetic field is aligned with the axis of the corresponding sensor. The amplitude of the signal is independent of the global positioning of the vehicle. The phase shift is associated with the angle alpha (α), which corresponds to the angle formed by the two centers of the sensors with respect to the axis of rotation. By way of example, a phase shift of 2 cm with respect to a circumference of 100 cm represents an angle of $2/100 \times 360° = 7.2°$.

More specifically, curves 8(a) and 8(b) show signals measured at the terminals of sensors 131 and 132 of a device 70 positioned on a wheel-tire assembly under conditions such as those depicted in FIG. 6. The signal corresponding to the sensor 132 lags behind the one corresponding to the sensor 131. The situation would be reversed in the situation depicted in FIG. 5, in which the signal from the sensor 132 would lead the signal from the sensor 131. For a given direction of motion, it is therefore possible to determine on which side the wheel-tire assembly is located from the relative phase shift between the signals measured by the two sensors (or, in other words, from the sign of the phase shift of the signals).

Figure 9:
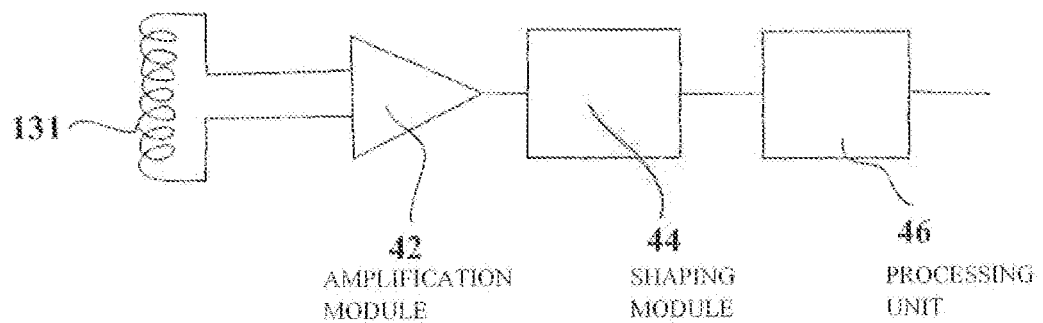
FIG. 9 is a functional diagram of a device according to an aspect of the invention.

FIG. 9 depicts a first functional flow diagram for the device 70. To measure and process the potential difference across the terminals of each sensor 131, 132, the device includes an amplification module 42 and a shaping module 44, which includes a filter having a high-pass cut-off frequency equal to 19 Hz and a comparator. The device 70 additionally includes a processing unit 46 to which a shaped signal from the shaping module 44 is directed in order, from analyzing a sign of a phase shift between two signals, to determine a direction of rotation of the wheel and, from this direction of rotation and from the direction of travel of the vehicle determined elsewhere by any means known per se, to deduce whether the corresponding wheel-tire assembly is positioned on the right or on the left.

As a preference, the processing unit 46 of the device 70 determines the sign of the phase shift between the two signals from the two coils by cross-correlating these two signals. An advantage of this method is that it is insensitive to the shape of the measured signals and that it allows information to be accumulated over a sufficiently lengthy period in order to improve the signal-to-noise ratio of the decision criterion and thus lead to an unequivocal solution. This method also has the advantage of being suited to sensors of differing sensitivities.

This device is suited to passenger vehicle tires of standard dimensions with an operating range of between 20 and 120 km/h. For tires of this type, the corresponding range of operating frequencies is 3 to 17 Hz. A cut-off frequency of the order of 19 Hz, with a filter suited to the vehicle conditions, makes it possible in an effective way to eliminate the influence of signals of a frequency equal to the rotational frequency and thus the parasitic influence of the Earth's magnetic field.

Figure 10:
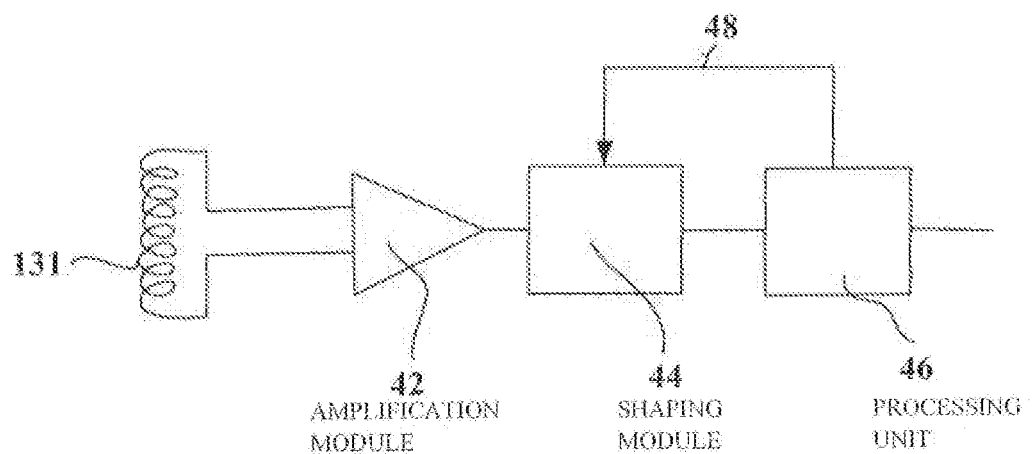
FIG. 10 is a functional flow diagram of a second device according to an aspect of the invention.

FIG. 10 shows an alternative form of the device 70. In this alternative form, the shaping module 44 includes an adaptive filter that has a high-pass cut-off frequency that can be varied as a function of the rotational speed of the wheel-tire assembly. A loop 48 connects the processing unit 46 to the signal shaping module 44 in order to indicate the account taken by the adaptive filter of a speed determined by a measurement unit (not shown). As a preference, the shaping module 44 is looped back with the amplitude of the signal, and this amplitude is directly dependent on the speed. It is therefore very easy to determine the rotational speed from the measured amplitude.

The information is transmitted by radio to a central processing unit on board the vehicle.

Of course, a principle of the invention can be exploited reliably in a method for determining the location of a wheel-tire assembly only if the device, embodiments of which are described above, is fitted on the same side of the wheel-tire assembly relative to the vehicle for all the assemblies 91 to 94, the position of which is to be determined. It is of little importance whether this be always on the outboard side or always on the inboard side of the vehicle, provided that it is systematically always on the same side. Attaching the device to an inflation valve is a particularly simple way of ensuring that all the devices will be located on the outboard side of the vehicle.

It is evident from the description above that the direction of motion is an important factor in identifying the location of the wheel-tire assemblies. A reversal of the direction leads to a reversal of the phase shift between the signals from the two sensors 131 and 132. The direction of motion can be determined using a known device (such as the ball device from EP 0 760 299, for example), using signals that already exist in the vehicle (application of power to the reversing lights) or alternatively, from the speed of the vehicle (which may be determined from the frequency of the signals measured by each of the two sensors 131 and 132). By deactivating the determination of location when the speed is below a certain limit (for example 30 km/h), it is possible to be sure that the vehicle is moving in a forward direction when the determination is performed.

The method described in this document merely determines on which side of the vehicle a wheel-tire assembly is located. If the precise position (front or rear of the vehicle) needs to be determined, then the method needs to be supplemented by any one of the known methods capable of discriminating between front and rear positions.

The invention is not restricted to the exemplary embodiments described and depicted, and various modifications can be made thereto without departing from its scope as defined by the attached claims.

The invention claimed is:

1. A device to be carried by a wheel-tire assembly to locate whether the assembly is positioned on a right side or a left side of a vehicle, the device comprising:
    two magnetic sensors with axes of maximum sensitivity, the two magnetic sensors providing two periodic signals that are phase shifted relative to one another, and each signal representing variations in a magnitude of a magnetic field detected by a corresponding one of the two magnetic sensors during a revolution of the wheel-tire assembly;
    a filtering element designed to eliminate components of the two periodic signals having frequencies equal to or below a given frequency; and
    a processing unit programmed to determine, from a phase shift between the two periodic signals, a direction of rotation of the wheel-tire assembly, and to deduce, from the determined direction of rotation and from a direction of travel of the vehicle, whether the wheel-tire assembly is located on the right side or the left side of the vehicle, wherein the two magnetic sensors are positioned on the wheel-tire assembly at distinct azimuthal locations.

2. A device according to claim 1, wherein the two magnetic sensors are positioned on the wheel-tire assembly such that the axes of maximum sensitivity are at similar positions.

3. A device according to claim 1, wherein the filtering element is a filter that has a high-pass cut-off frequency that is higher than a rotational frequency of the wheel-tire assembly.

4. A device according to claim 1, wherein the filtering element is an adaptive filter that depends on a rotational speed of the wheel-tire assembly.

5. A device according to claim 4, wherein the adaptive filter is looped back with an amplitude of an analyzed signal.

6. A device according to claim 1, wherein the filtering element is a filter that has a high-pass cut-off frequency that is higher than an intended range of operating frequencies of the device.

7. A device according to claim 6, wherein the high-pass cut-off frequency of the filter is higher than 17 Hz.

8. A device according to claim 1, wherein the filtering element is a filter that has a low-pass cut-off frequency of about 100 to 200 Hz.

9. A device according to claim 1, wherein the two magnetic sensors are positioned on the wheel-tire assembly at substantially a same distance from an axis of rotation of the wheel-tire assembly.

10. A device according to claim 1, wherein the axes of maximum sensitivity of the two magnetic sensors are approximately coincident.

11. A device according to claim 1, wherein the two magnetic sensors are positioned on the wheel-tire assembly with the axes of maximum sensitivity directed approximately circumferentially.

12. A device according claim 1, wherein the two magnetic sensors are positioned on the wheel-tire assembly with the axes of maximum sensitivity directed approximately parallel to an axis of rotation of the wheel-tire assembly.

13. A device according to claim 1, wherein a circumferential distance between centers of the two magnetic sensors is between 1 and 8 cm.

14. A device according to claim 1, wherein the processing unit is programmed to determine a sign of the phase shift between the two periodic signals by cross-correlating the two periodic signals.

15. A device according to claim 1, wherein the device is configured to be attached to an inflation valve of the wheel-tire assembly.

16. A device according to claim 1, wherein the device is attached to or incorporated in a tire.

17. A device according to claim 1, wherein the device is attached to or incorporated in a wheel of the wheel-tire assembly.

* * * * *